United States Patent [19]
Pearce et al.

[11] Patent Number: 5,539,879
[45] Date of Patent: Jul. 23, 1996

[54] CHECKSUM TECHNIQUE FOR VERIFYING INTEGRITY OF DISK SPACE RESERVED FOR SUSPEND-TO-DISK OPERATIONS

[75] Inventors: John J. Pearce, Del Valle; Kendall Witte, Austin, both of Tex.

[73] Assignee: Dell U.S.A., L.P., Austin, Tex.

[21] Appl. No.: 448,704

[22] Filed: May 24, 1995

[51] Int. Cl.$^6$ ............................. G06F 11/00; G06F 11/30
[52] U.S. Cl. ............... 395/184.01; 395/180; 395/182.03; 395/185.05
[58] Field of Search .................. 395/182.03, 183.01, 395/183.18, 183.20, 184.01, 185.05, 180

[56] References Cited

U.S. PATENT DOCUMENTS

| | | | |
|---|---|---|---|
| 4,092,732 | 5/1978 | Ouchi | 364/900 |
| 4,380,029 | 4/1983 | Bode | 360/48 |
| 4,727,544 | 2/1988 | Brunner et al. | 371/25.1 |
| 4,807,186 | 2/1989 | Ohnishi et al. | 364/900 |
| 5,032,932 | 7/1991 | Kogure et al. | 360/31 |
| 5,146,459 | 9/1992 | Shimizu | 371/21.5 |
| 5,181,206 | 1/1993 | Hashiguchi | 371/21.5 |
| 5,280,395 | 1/1994 | Matsuzaki | 360/31 |
| 5,422,890 | 6/1995 | Klingsporn et al. | 371/21.6 |

*Primary Examiner*—Hoa T. Nguyen
*Attorney, Agent, or Firm*—Haynes and Boone

[57] ABSTRACT

Method and apparatus for implementing a checksum technique for verifying the integrity of hard disk space reserved for use in implementing S2D capabilities is disclosed. In a preferred embodiment, a root block stored in a dedicated, fixed-size S2D partition comprises a plurality of entries each of which contains a pointer to the location of a corresponding pointer block located and a checksum for use in verifying the integrity of the pointer block. Similarly, each pointer block comprises a plurality of entries each of which contains a pointer to the location of a corresponding data block and a checksum for use in verifying the integrity of the data block. When an S2D operation is initiated, an S2D utility of the present invention locates a next available data block in the S2D partition or an extended partition, using the entries in the root block and pointer blocks, computes the checksum for the located data block, compares the computed checksum to the stored checksum for the block and, if the two checksums match writes a portion of RAM to the located block. If at any point, two checksums do not match, an error results and the S2D operation terminates. In one aspect of the invention, an MKS2D utility locates the available blocks of disk space for generating the extended partition, computes a checksum for each block and appropriately fills in the root and pointer blocks with pointers and checksums for use by the S2D utility. In another aspect of the invention, an RMS2D utility deletes the extended partition and returns the data blocks previously allocated thereto to the native OS and/or other partition(s).

22 Claims, 4 Drawing Sheets

005,539,879

CHECKSUM TECHNIQUE FOR VERIFYING INTEGRITY OF DISK SPACE RESERVED FOR SUSPEND-TO-DISK OPERATIONS

TECHNICAL FIELD

The invention relates generally to "suspend-to-disk" (S2D) capabilities and, more particularly, to a checksum technique for verifying the integrity of hard disk space reserved for use in implementing S2D capabilities.

BACKGROUND OF THE INVENTION

Portable personal computers (PCs) were first introduced in the early 1980s and have since enjoyed great commercial success and consumer acceptance. As the portable PC market has grown, users have begun to demand lighter weight, lower volume PCs that can be used for longer periods of time between battery charges. Meeting these demands has proved challenging in view of the fact that most portable PCs now support peripheral devices previously available only on desktop PCs. The additional peripherals greatly increase overall power consumption, making it difficult to achieve an optimal level of functionality while maintaining an acceptable battery life. Furthermore, although for reasons other than maximizing battery life, it has become desirable to more efficiently manage power consumption of desktop PCs in order to minimize overall operating costs.

Because many of the components and peripheral devices of both desktop and portable PCs consume a great deal of power even when they are idle, power management systems have been developed which cause each component or peripheral device to operate in the lowest power consumption mode with respect to present demands on the system. For example, many computers are capable of operating in several different reduced power consumption modes, such as "standby" and "suspend-to-disk" (S2D).

Standby mode essentially puts the PC to sleep by slowing the processor and system clock, turning off the LCD backlight and stopping hard drive activity. Alternatively, S2D mode saves the current system status, including device states, application program status, and the like, by writing the contents of RAM to the hard disk, at which point power is removed from all devices. When work is resumed, the hard drive copy is copied back to the RAM and operation resumes from the point at which it was interrupted.

Successful implementation of S2D requires that there be sufficient space available on the hard disk at the time an S2D is initiated to accommodate storage of the entire system RAM. Clearly, therefore, a significant obstacle confronting PC manufacturers is how to guarantee that, at any given time, there will be sufficient space on the hard disk to implement S2D. One solution to this problem has been to configure the hard disk to include an S2D partition of a fixed size sufficient to accommodate the amount of system RAM initially installed in the PC. While this solution is viable in some instances, for example, where a user does not intend to install additional RAM into the PC, it is deficient in two major respects. First, because the S2D partition is fixed, the hard disk area allocated to the S2D partition is unavailable for use by the native operating system (OS) of the PC, thereby reducing the effective hard disk size with respect to the native OS. Moreover, if additional RAM is installed in the PC, the S2D partition must be enlarged accordingly. Enlarging the S2D partition entails downloading the contents of the entire hard disk to other media so that the hard disk can be reconfigured to have a larger S2D partition and then reloading the hard disk contents back to the hard disk. Clearly, this process is undesirably time-consuming and somewhat risky, as it is would not be inconceivable for data to be lost during the downloading/reloading process.

Another solution has been to allocate to the S2D function a file in the native OS partition in which to store the system RAM during an S2D operation. This solution is also deficient in that, if additional RAM is installed in the PC, the file will likely not be large enough to store the contents of the larger RAM, thereby rendering the S2D function inoperable. This obviously presents problems where a user expects to be able to utilize S2D functions and then suddenly discovers that he or she cannot. Moreover, a user is given no advance warning as to when S2D functions are and are not available for use.

Yet another solution, as fully disclosed and described in commonly-assigned U.S. patent application Ser. No. 08/370, 595 (Atty. Docket No. DC-00691), filed Jan. 10, 1995, entitled "AUTOMATIC ADJUSTMENT OF DISK SPACE REQUIRED FOR SUSPEND-TO-DISK OPERATION," involves implementing S2D functions using a dedicated S2D partition of a fixed, minimum size, in combination with an extended partition of adjustable size. Entries in an S2D root block stored in the S2D partition point to blocks of hard disk space comprising the extended partition. The extended partition may be located in a native OS partition of the hard disk, some other available space on the hard disk, or both, and may or may not comprise contiguous hard disk space.

Although the latter technique obviates the above-described deficiencies inherent in the other "solutions" by ensuring the availability to the S2D functionality of sufficient hard disk space at any given time, while not unduly restricting the amount of hard disk space available to and useable by the native OS of the PC, a problem still remains in that, because only a portion of the space needed to perform the S2D is permanently reserved to the S2D partition, a possibility exists that the native OS will inadvertently use portions of the disk space comprising the extended partition, which, as described above, may reside in the native OS partition, for storing data. Accordingly, when an S2D is subsequently executed, a danger exists that the data stored by the OS in the extended partition will be partly or completely overwritten by the S2D utility. Therefore, what is needed is a way to prevent data accidentally written to the extended partition by the operating system from being overwritten during a subsequent S2D operation.

SUMMARY OF THE INVENTION

The foregoing problems are solved and a technical advance is achieved by method and apparatus for implementing a checksum technique for verifying the integrity of hard disk space reserved for use in implementing S2D capabilities. In a departure from the art, each of a plurality of entries in an S2D root block stored in a dedicated, fixed-size S2D partition points to a corresponding block of hard disk space comprising an adjustable extended partition and contains a checksum for verifying the integrity of that block. The extended partition may be located in a native OS partition of the hard disk, some other available space on the hard disk, or both, and may or may not comprise contiguous hard disk space.

In a preferred embodiment, a hierarchy of tables is constructed for indicating the location of the blocks of disk space comprising the extended partition. The S2D root block comprises a plurality of entries each of which contains a pointer to the location of a corresponding pointer block and a checksum for use in verifying the integrity of the pointer block. Similarly, each pointer block comprises a plurality of entries each of which contains a pointer to the location of a corresponding data block and a checksum for use in verifying the integrity of the data block. When an S2D operation is initiated, an S2D utility of the present invention locates a next available data block in the S2D partition or extended partition, using the entries in the root block and pointer blocks, computes the checksum for the located data block, compares the computed checksum to the stored checksum for the block and, if the two checksums match, indicating that the block has not been overwritten by the native OS, writes a portion of RAM to the located block. This process continues until the entire RAM is saved to the hard disk. If at any point, the two checksums do not match, indicating that the data block has been utilized by the OS, the block is rejected in favor of the next unused block. If rejecting the block reduces the size of the S2D data area below the size needed, an error results and the S2D operation terminates. At this point, an error message may be generated to the user, informing the user that the S2D utility cannot be implemented and the state of the computer will not be saved if the computer is powered down.

In one aspect of the invention, an MKS2D utility fills in the root and pointer blocks and reserves the data blocks for use by the S2D utility as follows. When the MKS2D utility is implemented, it computes the size of the extended partition needed, taking into account the amount of RAM installed in the PC, as well as the size of the S2D partition. The native OS is then used to write an "extent file" the size of the extended partition needed with some known pattern. At that point, the utility enters a loop wherein the hard disk is read to locate the next available block of the extent file. Upon locating the next available block, the utility computes a checksum for the block and then stores the checksum and a pointer to the block in the appropriate entry of the root or pointer block. In a preferred embodiment, the MKS2D utility may be run any time the hard disk needs to be reformatted with respect to S2D operations, such as when RAM is added to or removed from the PC.

In another aspect of the invention, an RMS2D utility deletes the extended partition and returns the data blocks previously allocated thereto to the native OS and/or other partition(s). In a preferred embodiment, the RMS2D utility may be run any time by a user to disable S2D operations, thereby increasing the amount of hard disk space available to the native OS. RMS2D is not required.

A technical advantage achieved with the invention is that it prevents data inadvertently written to blocks of disk space previously "reserved" to the S2D utility from being overwritten when an S2D operation is implemented.

A further technical advantage achieved with the invention is that it provides a fail-safe measure for ensuring that the S2D utility utilizes only those blocks which are truly "available" for use at the time an S2D operation is implemented.

Another technical advantage achieved with the invention is that it enables RAM to be installed in or removed from a PC and the hard disk appropriately repartitioned without the user having to download and subsequently reload the entire contents of the hard disk.

DETAILED DESCRIPTION OF THE PREFERRED EMBODIMENT

Figure 1:
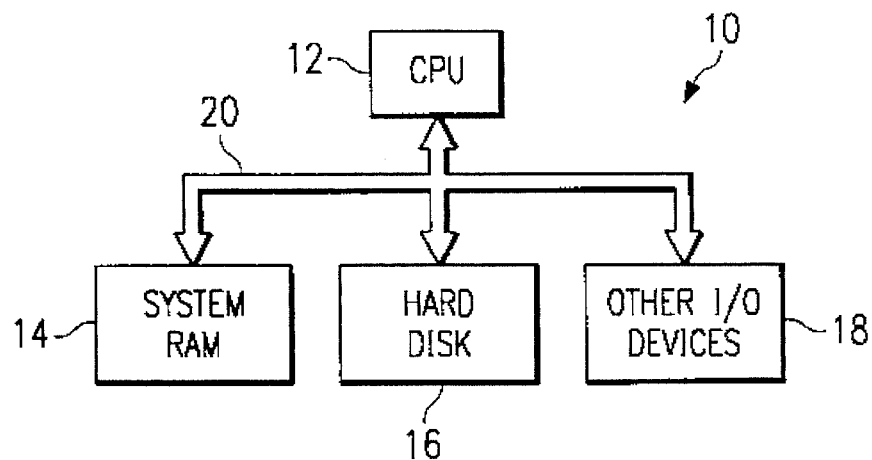
FIG. 1 is a block diagram of a PC for implementing a suspend-to-disk utility embodying features of the present invention.

Referring to FIG. 1, a personal computer (PC) capable of operating in a suspend-to-disk (S2D) mode is designated by a reference numeral 10. The PC 10 comprises a central processing unit (CPU) 12, system RAM 14, a hard disk 16 and other I/O devices, collectively designated by a reference numeral 18, all interconnected via a bus 20. Instructions comprising an MKS2D utility, an S2D utility and an RMS2D utility, which are described in detail below with reference to FIGS. 3, 5 and 6, respectively, are stored in a storage device, for example, on the hard disk 16 or a PROM (not shown), connected to the CPU 12. When an S2D operation is initiated, for example, by a user's pressing a designated key or button or by the elapse of a predetermined time period during which there has been no I/O activity, the contents of the RAM 14 are written to an S2D partition (FIG. 2A) and an extended partition (FIG. 4) of the hard disk 16. It should be noted that, while the RAM 14 initially comprises a first amount of memory, for example, 8 megabytes (MB), the size of the RAM 14 may be increased or decreased by a user according to his or her needs. As previously indicated, it is a feature of the present invention to enable the size of the RAM 14 to be selectively increased or decreased without requiring the user manually to reformat the disk 16 to perform S2D operations or to sacrifice the ability subsequently to utilize such operations.

Figure 2A:
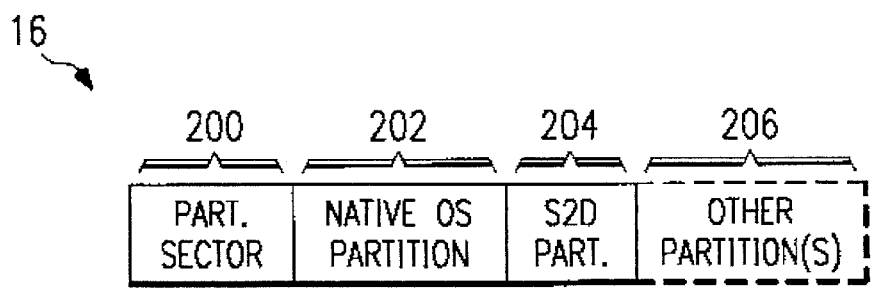
FIG. 2A is a block diagram illustrating the format of a hard disk of the PC of FIG. 1.

FIG. 2A is a block diagram of the format of the hard disk 16. It will be appreciated that the format of the hard disk 16 as shown in FIG. 2A is conventional in some respects and has been modified in others for the purposes of the present invention. The hard disk 16 includes a partition sector 200, which is the structure that all IBM compatible PCs use to define the partitions of a hard disk, as well as a native operating system (OS) partition 202. In accordance with the feature of the present invention, the hard disk also includes an S2D partition 204, which is of some minimum size necessary to store an S2D root block (FIG. 2C), as will be described. The hard disk 16 may also optionally include up to two additional partitions, collectively designated by a reference numeral 206, although the inclusion of such additional partitions 206 is not necessary to the operation of the present invention.

Figure 2B:
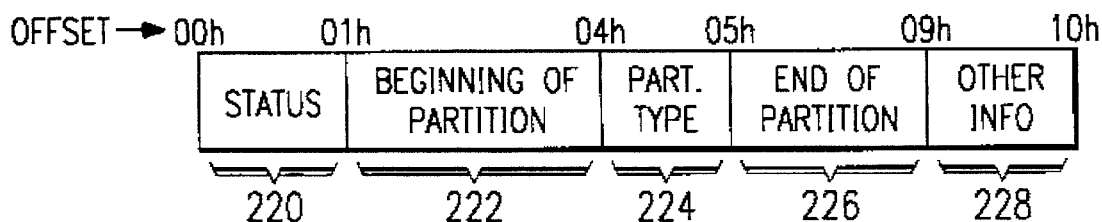
FIG. 2B is a block diagram illustrating the format of a partition table entry.

The partition sector 200 contains a partition table (not shown) comprising four table entries numbered 0 through 3, each of which correspond to a partition of the hard disk 16, such that, as previously implied, the hard disk 16 may be formatted to include up to four partitions. FIG. 2B illustrates the format of the partition table entries. As shown in FIG. 2B, a first field 220 of each entry indicates whether the partition associated with the entry is bootable. A second field 222 of each entry indicates the physical location of the beginning of the partition on the hard disk 16 in terms of head, sector and cylinder. A third field 224 of each entry indicates the system type of the partition; it is this field that is used to identify the entry associated with the S partition type; it is this, for example, native OS or S2D. A fourth field 226 of each entry indicates the physical location of the end of the partition on the hard disk 16 in terms of head, sector and cylinder. A remaining field 228 of each entry contains additional information about the partition. Typically, the first entry in the partition table (entry 0) defines the native OS partition 202. One of the remaining partition table entries, for example, entry 1, defines the S2D partition 204.

Figure 2C:
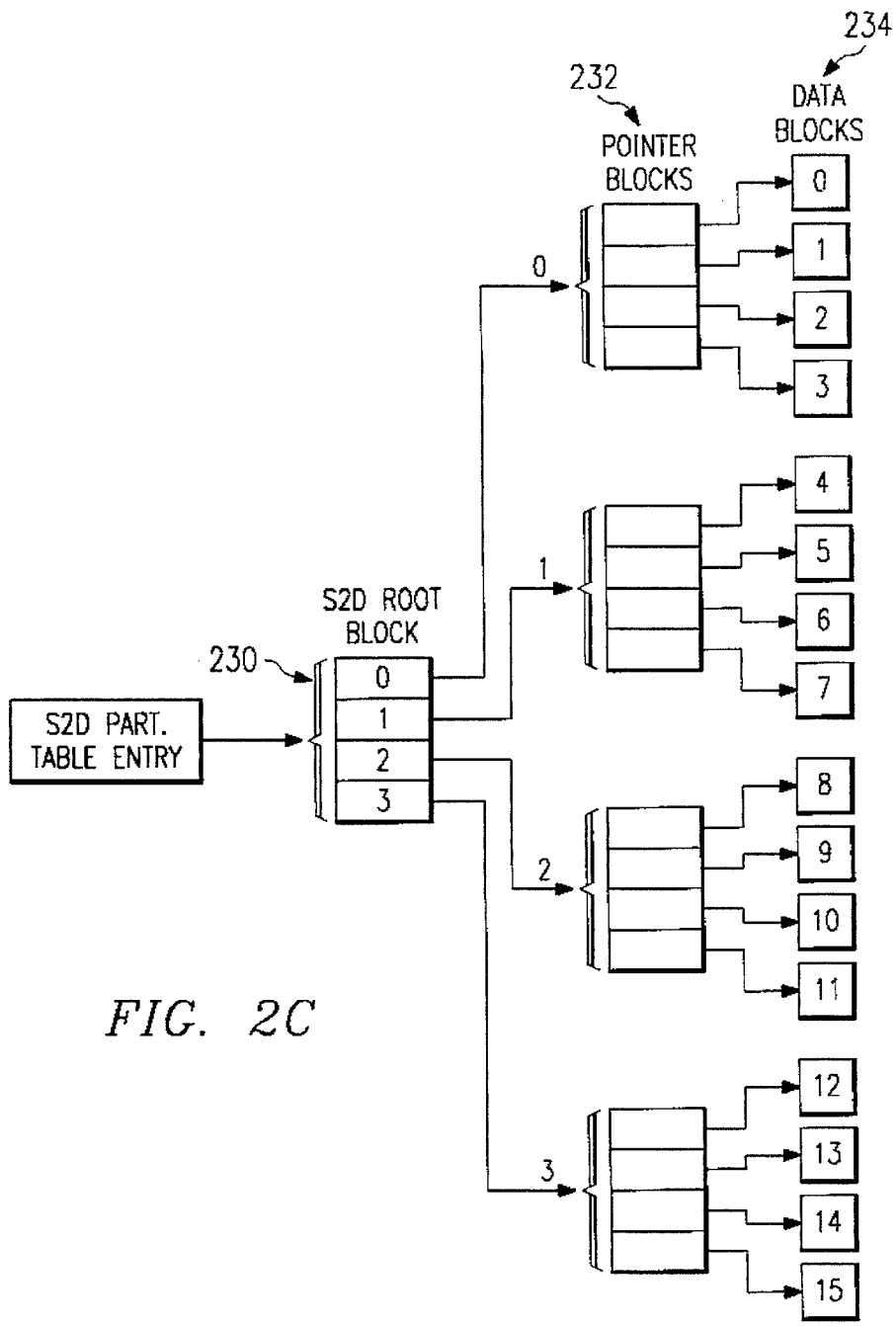
FIG. 2C is a block diagram of a hierarchy of pointers used in implementing the present invention.

In accordance with a feature of the present invention, an extended partition (FIG. 4) of the disk 16 is defined using a hierarchy of pointers to indicate the locations of available data blocks comprising the extended partition. Referring to FIG. 2C, as indicated above, an S2D partition table entry (entry 1), points to the S2D partition 204 (FIG. 2A). Located at the beginning of the S2D partition 204 is a root block 230 comprising m entries numbered 0 through (m-1), each of which point to one of m pointer blocks 232. Similarly, each of the m pointer blocks 232 comprises n entries numbered 0 through (n-1), where n may or may not be equal to m. Each of the n entries of each of the m pointer blocks point to one of a plurality of data blocks 234 comprising the extended partition (FIG. 4), such that the total number of data blocks 234 is equal to m*n. It should be noted that the number and size of the root, pointer and data blocks 230, 232 and 234, respectively, will be directly dependent on the size of the extended partition necessary to implement the S2D operations, as will be described below. In the embodiment illustrated in FIG. 2C, m and n are both equal to 4 and the total number of data blocks 234 is equal to 16. In the preferred embodiment, the data blocks are of a known, fixed size; however, this need not be the case.

Figure 3:
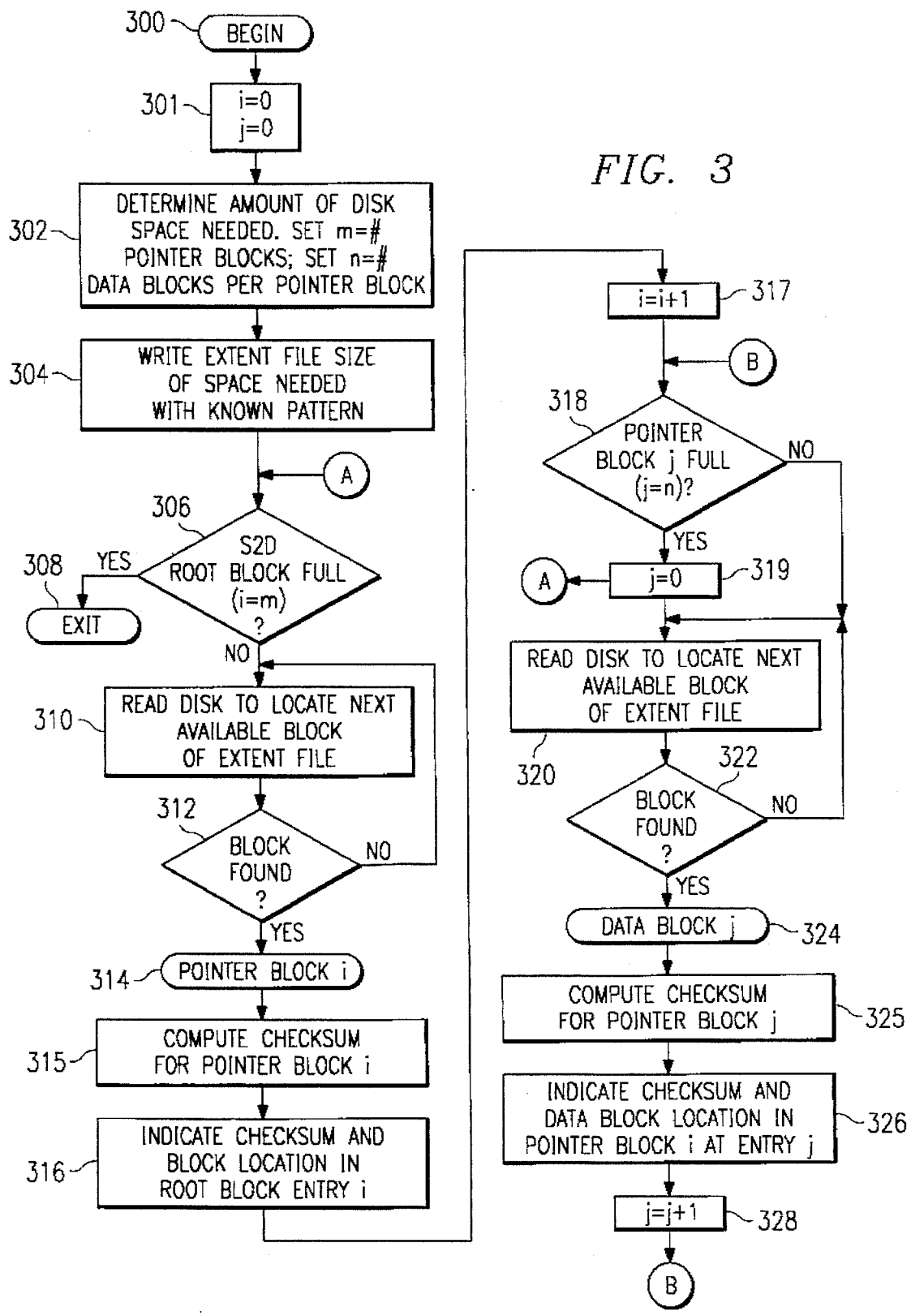
FIG. 3 is a flowchart of the operation of an MKS2D utility of the present invention.

FIG. 3 is a flowchart of the operation of the MKS2D utility of the present invention for creating an extended partition of a size appropriate to accommodate storage of the contents of RAM 14. As indicated above with reference to FIG. 1, instructions for execution by the CPU 12 to implement the MKS2D utility are stored in a storage device connected to the CPU 12. Execution of the MKS2D utility is initiated by a user in step 300, for example, after the size of the RAM 14 is increased or decreased. In step 301, variables i and j, for indicating a current pointer block and current data block, respectively, are initialized to 0. In step 302 a determination is made as to the size of the extended partition necessary to implement S2D operations, taking into account the size of the RAM 14 and the size of the S2D partition 204. Also in step 302, a determination is made as to the number of pointer blocks 232 and data blocks 234 per pointer block needed, which numbers are stored in variables m and n, respectively.

Figure 4:
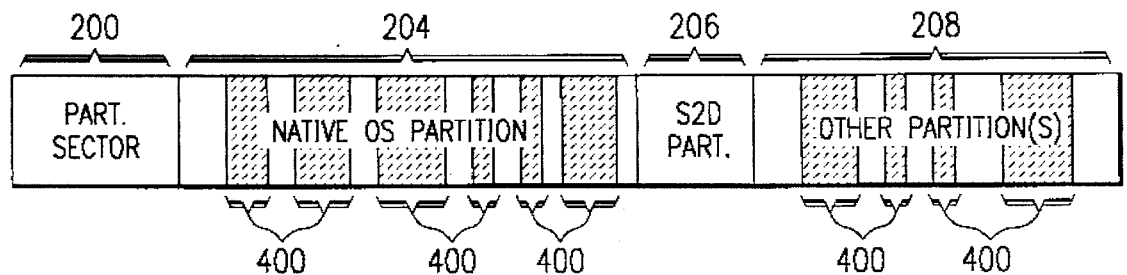
FIG. 4 is a block diagram illustrating an extent file generated by the MKS2D utility of the present invention.

In step 304, the native OS of the PC 12 is used to write an "extent file," which will become the extended partition, of the size determined in step 302 with a known, periodically repetitive pattern. As illustrated in FIG. 4, the extent file 400 may comprise noncontiguous disk space and include disk space located within the native OS partition 202 and other partitions 206, as well as within the S2D partition 206.

Referring again to FIG. 3, in step 306, a determination is made whether the root block 230 has been completely filled in by comparing the value of the variable i with the value stored in the variable m. If so, execution proceeds to step 308, in which execution of the MKS2D utility is terminated. If the root block 230 is not completely filled in, execution proceeds to step 310, in which the hard disk 16 is read to find the next available block of the extent file 400 written in step 304. In step 312, a determination is made whether a block has been located. If not, execution returns to step 310; otherwise, execution proceeds to step 314. In step 314, the located block is designated as pointer block i. In step 315, a checksum is computed for pointer block i, it being understood that such a checksum may be generated in any number of known ways, including, for example, generating an arithmetic quantity based on some or all of the bits of the known pattern written in pointer block i. In step 316, the checksum computed in step 315 and a pointer to the physical location of pointer block i on the disk 16 is written to entry i of the root block 230. In step 317, the variable i is incremented by 1.

In step 318, a determination is made whether pointer block i is completely filled in by comparing the value of the variable j to the value stored in the variable n. If so, execution proceeds to step 319, in which the variable j is set to 0, and then returns to step 306 to begin searching for the next pointer block. If pointer block i is not completely filled in, execution proceeds to step 320, in which the disk 16 is read to find the next available block of the extent file 400. In step 322, a determination is made whether a block has been located. If not, execution returns to step 320; otherwise, execution proceeds to step 324. In step 324, the located block is designated as data block j. In step 325, a checksum is computed for data block j, it being understood that such a checksum may be generated in any number of known ways, including, for example, generating an arithmetic quantity based on some or all of the bits of the known pattern written in data block j. In step 326, the checksum computed in step 325 and a pointer to the physical location of data block j is written to entry j of pointer block i. In step 328, the variable j is incremented by 1. Execution then returns to step 318. In this manner, the root block 230 and pointer blocks 232 are appropriately filled in with pointers to the locations of the pointer blocks 232 and data blocks 234, respectively, on the disk 16.

Figure 5:
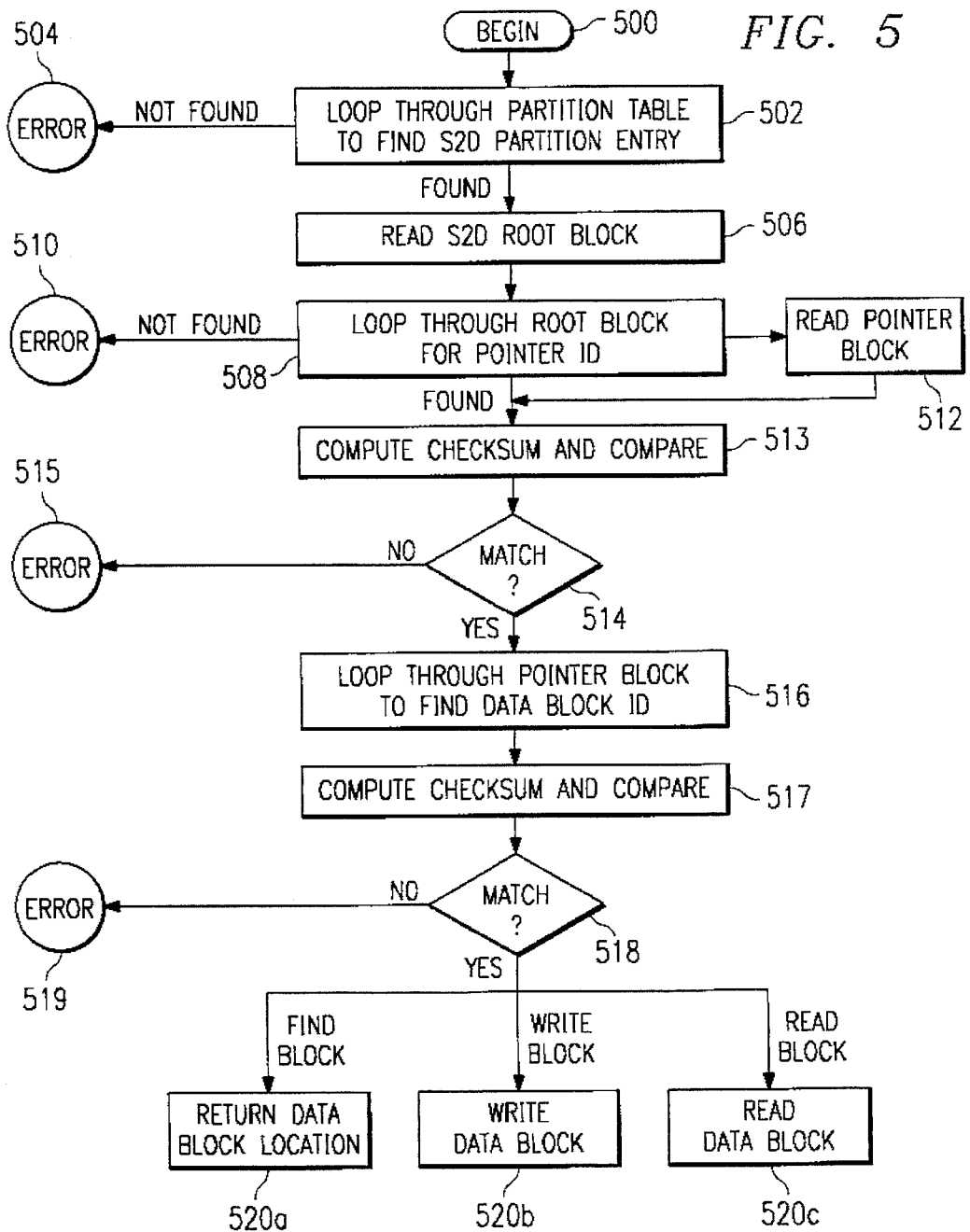
FIG. 5 is a flowchart of the operation of an S2D utility of the present invention.

FIG. 5 is a flowchart of the operation of an exemplary S2D utility for locating a particular data block of the extended file and reading from, writing to, or returning the disk location of the data block. As indicated above with reference to FIG. 1, instructions for execution by the CPU 12 to implement the S2D utility are stored in a storage device connected to the CPU 12. It should be noted that the pointer block entry that points to the desired one of the data blocks is determined by dividing a number designating the desired data block by the number of pointer blocks. The resulting quotient and remainder will respectively designate the appropriate pointer block and pointer block entry containing the pointer to the desired data block. For example, referring again to FIG. 2C, the pointer to the data block 14 is located by dividing 14 by the number of pointer blocks 232, in this case 4, resulting in a quotient of 3 and a remainder of 2. Accordingly, the pointer to data block 14 is contained in entry 2 of pointer block 3. As previously indicated, a pointer to pointer block 3 is contained in entry 3 of the root block 230.

Referring again to FIG. 5, execution of the S2D utility begins in step 500. In step 502, the utility loops through the partition table (not shown) in the partition sector 200 to locate an S2D partition entry. If an S2D partition entry is not found, execution terminates in step 504; otherwise, execution proceeds to step 506. In step 506, the S2D root block 230 located at the beginning of the S2D partition 204 is read. Assuming that, as described above, the S2D utility is being used to locate data block 14, in step 508, the utility loops through the root block 230 to locate the entry that corresponds to the appropriate pointer block, which in the above example is entry 3. If the entry is not found, execution terminates in step 510; otherwise, execution proceeds to step 512.

In step 512, the utility reads the pointer block from the disk 16. In step 513, the utility computes the check sum for the pointer block and compares it with the checksum for the pointer block stored in the root block entry corresponding to the pointer block. In step 514, if the two checksums do not match, indicating that the pointer block has been altered in some manner, for example, by user data being written to the block, execution terminates in step 515. If in step 514, the two checksums do match, execution proceeds to step 516.

In step 516, the utility loops through the pointer block to locate the entry corresponding to the desired data block, which in the above example would be entry 2. If the entry is not found, execution terminates in step 516; otherwise, execution proceeds to step 517, in which the utility computes the check sum for the data block and compares it with the checksum for the data block stored in the pointer block entry corresponding to the data block. In step 518, if the two checksums do not match, indicating that the data block has been altered in some manner, for example, by user data being written to the block, execution terminates in step 519. If in step 518, the two checksums do match, execution proceeds to step 520a, 520b or 520c, depending on whether the utility is being utilized to return the location of the desired data block, write data to the desired data block, or read data from the desired data block, respectively.

Figure 6:
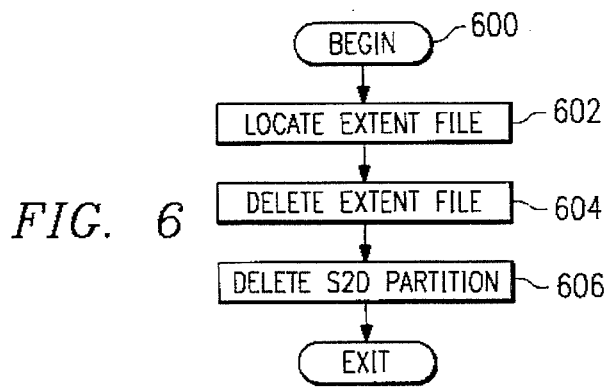
FIG. 6 is a flowchart of the operation of an RMS2D utility of the present invention.

FIG. 6 is a flowchart of the operation of the RMS2D utility of the present invention for removing the extended partition written by the MKS2D utility (FIG. 3), thereby eliminating the capability to perform S2D operations until the MKS2D utility is subsequently run again. As indicated above with reference to FIG. 1, instructions for execution by the CPU 12 to implement the RMS2D utility are stored in a storage device connected to the CPU 12. Operation begins in step 600. In step 602, the extent file 400 created by the MKS2D utility (FIG. 4) in step 304 is located. In step 604, the extent file 400 is deleted. In step 606, the S2D partition 204 is deleted. Operation terminates in step 608.

In this manner, using checksums to verify that a block in the extended partition has not been accidentally utilized by the operating system, the present invention prevents user data from being overwritten or erased during an S2D operation.

It is understood that the present invention can take many forms and embodiments. The embodiments shown herein are intended to illustrate rather than to limit the invention, it being appreciated that variations may be made without departing from the spirit or the scope of the invention. For example, many different types of data structures and pointer hierarchies may be used to indicate the location of the extended sector, such as a "root block-to-data block" or a "root block-to-pointer block 1-to-pointer block 2-to data block" structure. In addition, the checksums may be used to verify the integrity of disk space reserved to various applications programs.

Although illustrative embodiments of the invention have been shown and described, a wide range of modification, change and substitution is intended in the foregoing disclosure and in some instances some features of the present invention may be employed without a corresponding use of the other features. Accordingly, it is appropriate that the appended claims be construed broadly and in a manner consistent with the scope of the invention.

What is claimed is:

1. In a computer comprising a hard disk electrically connected to a system memory, a method for verifying the integrity of a plurality of blocks of hard disk space reserved for use in implementing a requested computer operation, said requested computer operation being executed other than by a native operating system of said computer, the method comprising:

responsive to a first command, for each of said blocks of hard disk space:
computing a first checksum for said block; and
recording said first checksum at a designated location on said hard disk; and responsive to a second command identifying one of said blocks of hard disk space:
reading said hard disk to locate said identified one of said blocks;
responsive to location of said identified one of said blocks, computing a second checksum for said identified one of said blocks;
comparing said second checksum with said recorded first checksum for said identified one of said blocks;
responsive to said compared checksums being identical, writing data stored in said system memory to said identified one of said blocks; and
responsive to said compared checksums not being identical, indicating that data stored in said system memory may not be written to said identified one of said blocks.

2. The method of claim 1 wherein said recording further comprises recording a pointer to said block with said first checksum at said designated hard disk location.

3. The method of claim 1 wherein said requested computer operation is a suspend-to-disk (S2D) operation.

4. The method of claim 3 wherein said designated location is within an S2D partition of said hard disk, said S2D partition being of a minimum size necessary for storing said first checksums for said blocks of hard disk space.

5. The method of claim 1 wherein said blocks of hard disk space are noncontiguous.

6. In a computer comprising a hard disk electrically connected to a system memory, a method for verifying the integrity of blocks of hard disk space reserved for use in implementing an S2D operation, the method comprising:

responsive to a first command, reading said hard disk to locate said blocks of said hard disk space;
for each of said located blocks;
computing a first checksum for said located block; and
storing at a designated location on said hard disk an entry corresponding to said located block, said located block entry comprising said first checksum and a pointer to a location on said hard disk of said located block; and responsive to a second command:
reading said hard disk to locate a first one of said blocks of hard disk space;
responsive to said first one of said blocks being located, computing a second checksum for said first one of said blocks;
comparing said second checksum with said stored first checksum for said first one of said blocks;

responsive to said compared checksums being identical, writing data stored in said system memory to said first one of said blocks; and responsive to said compared checksums not being identical, reading said hard disk to locate a next one of said blocks.

7. The method of claim 6 wherein said designated location comprises an S2D partition of said hard disk, said S2D partition being of a minimum size necessary for storing said located block entries.

8. The method of claim 6 wherein said located blocks comprise a plurality of data blocks for storing contents of said system memory during said S2D operation and a plurality of pointer blocks, and wherein said storing further comprises:

storing in each of said pointer blocks a plurality of pointer blocks entries, each of said pointer block entries comprising said located block entry for one of said data blocks; and storing in a root block of said hard disk a plurality of root block entries, each of said root block entries comprising said located block entry for one of said pointer blocks.

9. The method of claim 8 wherein said root block is stored in an S2D partition of said hard disk, said S2D partition being of a minimum size necessary for storing said root block.

10. The method of claim 6 wherein said reserved hard disk space comprises noncontiguous disk space.

11. In a computer comprising a hard disk electrically connected to a system memory, a method for verifying the integrity of hard disk space reserved for use in implementing S2D capabilities, the method comprising:

responsive to a first command:
  determining an amount of hard disk space needed to store contents of said system memory during said S2D operation;
  writing to said hard disk an extent file of a size equal to said determinded amount with a known pattern;
  reading said hard disk to locate a block of said extent file;
  computing a first checksum for said located block;
  storing a pointer to said located block and said first checksum at a designated location on said hard disk; and
  repeating said reading, computing and storing for all of said extent file; and responsive to a second command:
  locating a designated block of said extended partition;
  computing a second checksum for said located designated block;
  comparing said second checksum with said stored first checksum for said located designated block;
  responsive to a determination that said checksums are identical writing a portion of said system memory contents to said located designated block; and
  responsive to a determination that said checksums are not identical, returning to said locating; and wherein said located blocks comprise an extended partition.

12. The method of claim 11 wherein a first set of said located blocks comprise data blocks and a second set of said located blocks comprise pointer blocks, said computing and storing further comprising:

for each of said located data blocks:
  computing a first checksum for said data block; and
  writing said data block first checksum and a pointer to a location of said data block in an entry of one of said pointer blocks; and for each of said located pointer blocks:
  computing a first checksum for said pointer block; and
  writing said pointer block first checksum and a pointer to a location of said pointer block in an entry of a root block stored in an S2D partition of said hard disk.

13. The method of claim 12 wherein said S2D partition is of a minimum size necessary for storing said root block.

14. In a computer comprising a processor, a hard disk and system memory electrically interconnected via a bus, an apparatus for verifying the integrity of a plurality of blocks of hard disk space reserved for use in implementing a suspend-to-disk (S2D) operation, the apparatus comprising:

logic executable by said processor responsive to a first command for reading said hard disk to locate said blocks of said hard disk space;

logic executable by said processor for computing a first checksum for each of said located blocks;

logic executable by said processor for storing at a designated location on said hard disk, for each of said located blocks, an entry corresponding to said located block, said located block entry comprising said first checksum for said located block and a pointer to a location on said hard disk of said located block;

logic executable by said processor responsive to a second command for reading said hard disk to locate a first one of said blocks of hard disk space;

logic executable by said processor and responsive to said first one of said blocks being located for computing a second checksum for said first one of said blocks;

logic executable by said processor for comparing said second checksum with said stored first checksum for said first one of said blocks;

logic executable by said processor and responsive to said compared checksums being identical for writing data stored in said system memory to said first one of said blocks; and logic executable by said processor and responsive to said compared checksums not being identical for reading said hard disk to locate a next one of said blocks.

15. The apparatus of claim 14 wherein said designated location comprises an S2D partition of said hard disk, said S2D partition being of a minimum size necessary for said located block entries.

16. The apparatus of claim 14 wherein said located blocks comprise a plurality of data blocks for storing contents of said system memory during said S2D operation and a plurality of pointer blocks, and wherein said storing logic further comprises:

logic executable by said processor for storing in each of said pointer blocks a plurality of pointer block entries, each of said pointer block entries comprising said located block entry for one of said data blocks; and logic executable by said processor for storing in a root block of said hard disk a plurality of root block entries, each of said root block entries comprising said located block entry for one of said pointer blocks.

17. The apparatus of claim 16 wherein said root block is stored in an S2D partition of said hard disk, said S2D partition being of a minimum size necessary for storing said root block.

18. The apparatus of claim 14 wherein said reserved hard disk space comprises noncontiguous disk space.

19. In a computer comprising a processor, a hard disk and system memory electrically interconnected via a bus, an apparatus for verifying the integrity of a plurality of blocks of hard disk space reserved for use in implementing a suspend-to-disk (S2D) operation, the apparatus comprising:

means responsive to a first command for reading said hard disk to locate said blocks of said hard disk space:

means for computing a first checksum for each of said located blocks;

means for storing at a designated location on said hard disk, for each of said located blocks, an entry corresponding to said located block, said located block entry comprising said first checksum for said located block and a pointer to a location of said located block;

means responsive to a second command for reading said hard disk to locate an identified one of said blocks of hard disk space;

means responsive to said identified one of said blocks being located for computing a second checksum for said identified one of said blocks;

means for comparing said second checksum with said stored first checksum for said identified one of said blocks;

means responsive to said compared checksums being identical for writing data stored in said system memory to said identified one of said blocks; and means responsive to said compared checksums not being identical for reading said hard disk to locate a next identified one of said blocks.

20. The apparatus of claim 19 wherein said located blocks comprise a plurality of data blocks for storing contents of said system memory during said S2D operation and a plurality of pointer blocks, and wherein said storing means further comprises:

means for storing in each of said pointer blocks a plurality of pointer block entries, each of said pointer block entries comprising said located block entry for one of said data blocks; and means for storing in a root block of said hard disk a plurality of root block entries, each of said root block entries comprising said located block entry for one of said pointer blocks.

21. The apparatus of claim 20 wherein said root block is stored in an S2D partition of said hard disk, said S2D partition being of a minimum size necessary for storing said root block.

22. The apparatus of claim 19 wherein said reserved hard disk space comprises noncontiguous disk space.

* * * * *